April 16, 1929.     A. SCHNÜRLE     1,709,744
ATOMIZING OIL
Filed June 30, 1924
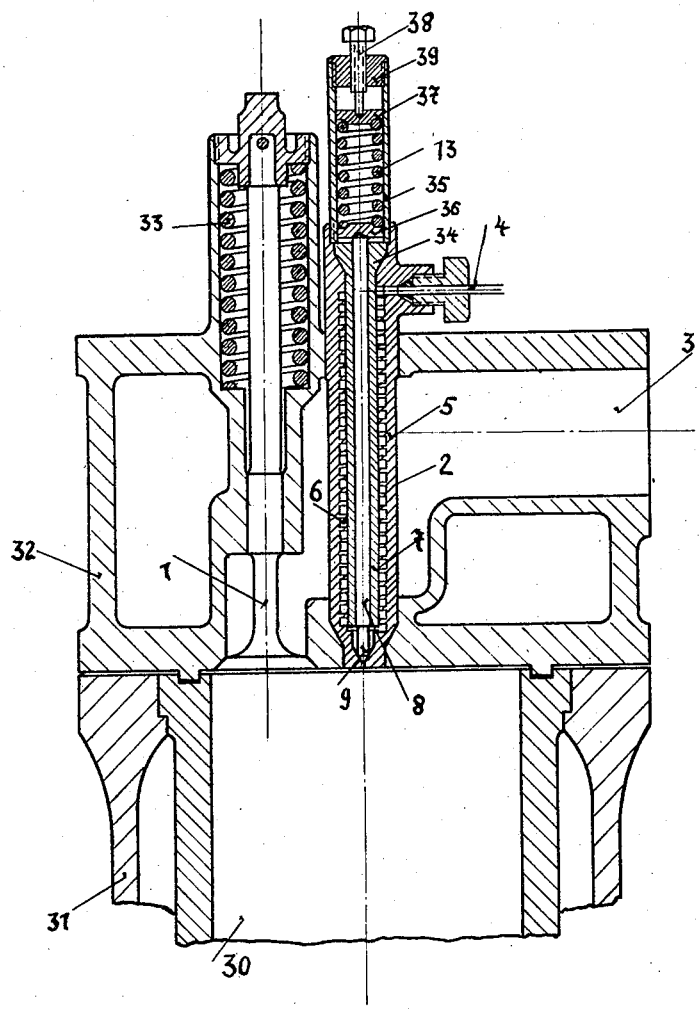

Patented Apr. 16, 1929.

1,709,744

UNITED STATES PATENT OFFICE.

ADOLF SCHNÜRLE, OF STUTTGART, GERMANY.

ATOMIZING OIL.

Application filed June 30, 1924, Serial No. 723,253, and in Germany July 5, 1923.

My invention relates to a method and. means for atomizing oil which is to be intimately mixed with air for combustion and also to means adapted to be connected with an internal combustion engine for utilizing this novel mode of atomization. The invention is applicable also to oil furnaces or to all other cases where intimate mixtures of the kind described are required. In the following specification the application to a high speed oil engine will be described by way of example. It is a further object of my invention to provide a high speed oil engine in which oil is injected into air compressed in the combustion chamber of a cylinder and ignited by the heat of compression.

An engine which is designed and operated in accordance with my invention may be used for stationary plants, but is more particularly destined for motor vehicles of all kinds.

The number of revolutions per minute is mainly determined by the time required for heating the oil injected into the combustion chamber to ignition temperature and for obtaining an intimate mixture of oil and air so as to effect rapid and complete combustion.

Reduction of the time required for heating the oil to ignition temperature is attained by heating the oil to as high a temperature as possible before injecting it into the combustion chamber, the time required for heating the oil to ignition temperature in contact with the hot air for combustion being thus greatly reduced. Care should be taken, however, that no oil or oil vapor can enter the combustion chamber while the oil is being heated outside the engine cylinder, as this would cause pre-ignition. This is prevented by a device which will presently be described.

An intimate mixing of the oil and air for combustion has heretofore been obtained by three methods:—the Diesel method of atomizing fuel by compressed air, this method involving the drawback of requiring an expensive compressor and of considerably cooling the oil during injection, the Steinbecker method of atomizing fuel by aid of gases of combustion under high pressure, and the method of solid injection. Combustion now proceeds the quicker, the finer the atomization of the oil.

In contradistinction thereto effective atomization is brought about according to my invention in a simple manner by mixing heavy oil with a readily evaporating substance and heating the mixture outside of the combustion chamber of the cylinder at a pressure considerably exceeding the pressure prevailing in the combustion chamber at the time of injection, so that after injection the readily evaporated substance, which is finely distributed in the heavy oil, evaporates or expands rapidly and thereby breaks up the drop of heavy oil injected by an action resembling an explosion, the minute steam bubbles forming within and finely distributed in the oil cause this latter to be reduced to a fine mist. The readily evaporating substance may be liquid or vaporized before injection and must be capable of maintaining its own vapor tension independently of the oil. The readily evaporating substance must not form a solution with oil, as in doing so it would lose its own steam tension. Therefore petrol as well as all other light oils are not adapted for use for the purpose in view.

Apparently the substance best suited for my purpose is water which readily forms an emulsion with the oil, and is not dissolved in the oil, but suspended therein in the form of extremely fine globules. Water further assists and accelerates the combustion process by catalytic action preventing the deposition of carbon and coke and cooling the engine from within. The water absorbs a certain amount of heat for vaporization and for the further heating up and in consequence thereof the maximum temperature of the gases is reduced. The heat absorbed by the water is not lost, but participates in the entire process in doing useful work. The water may be added to the oil by means of a separate pump or an emulsion of oil and water may be formed by an emulsifying agent, the engine being operated by means of this emulsion. There are, however, certain oils which already contain a certain percentage of water so that when using them an addition of water can be dispensed with.

My novel method of atomizing fuel by means of water or steam is important not only for high speed oil engines, but also in all cases where oil is to be finely atomized in order to intimately mix it with the air of combustion. It may be applied to four cycle and two cycle engines. Atomization in accordance with my invention can be effected in several ways, viz.

1. The readily vaporizable substance is evaporated before injection so that the vapor expands during injection and atomizes the oil.

2. The substance is still in liquid condition at the moment of injection so that vapor is formed only at the moment of injection. The oil will be evaporated immediately or only after it has absorbed heat from the compressed hot air. This depends on the temperature of the oil, so that it is possible to effect evaporation directly at the injection nozzle or at a point in the combustion chamber some distance away from the nozzle.

In the first case of evaporation of the readily vaporizable substance (such as water) before injection the needle valve of the fuel nozzle must be positively operated by a cam, as in normal oil engines.

In contradistinction thereto in the device illustrated in the drawing the needle valve being acted upon by a spring will open automatically during the compression stroke and will allow the quantity of oil conveyed by the pump to enter the cylinder. In order that the pressure generated by the pump can propagate uniformly in the conduits the easily volatile matter contained in the oil must not be converted into vapor. This is obtained according to this invention by acting on the oil in the conduit with a comparatively high pressure which exceeds the vapor pressure of the easily volatile matter.

If the oil is heated enough, evaporation of the easily volatile matter will take place at the moment, when the oil enters the cylinder and will result in a satisfactory atomization of the oil. The fuel pump used may be a pump of normal design with admission and exhaust valves.

I will now proceed to more particularly describe the construction of a device in which the water admixed to the oil is not evaporated before injection. A device of this kind is illustrated diagrammatically by way of example in the drawing which is an axial section of the top end of the cylinder.

In this device the fuel is heated by the exhaust gases. 30 is the top end of the cylinder proper, 31 is the cooling water jacket, 32 is the cylinder head of a four stroke cycle engine. 1 is the exhaust valve in the cylinder head, which is operated in the usual manner by means not shown in the drawing, but well known to any person skilled in the art, and 33 is the coil spring acting on it. 3 is the exhaust conduit, extending across the cylinder head and 2 is the injection valve extending across this conduit. 4 is the pipe leading fuel to the injection valve. In the inner wall of the valve casing is formed a helical groove 6. The sleeve 7 mounted in the valve casing serves for guiding the valve needle 8. 9. The sleeve is fixed in the upper end of the valve casing by means of the conical enlargement 34 and is pressed on its seat by the sleeve 35, which is screwed into the valve casing. In the sleeve 35 is mounted a spring 13, which acts on the needle valve 8, 9 by means of the valve disc 36 mounted on the upper end of the needle. The pressure exerted by a spring 13 can be adjusted by means of a second disc 37 acted upon by a set screw 38 extending through a stopper 39 closing the sleeve 35.

Sleeve 7 forms the inner wall of the helical groove 6, which is thus transformed into a closed conduit through which the oil entering through pipe 4 is guided down to the bottom part of the casing closed by the conical point 9 of needle 8, this point being reduced in diameter relative to the needle proper.

The operation of this device is the following: Fuel is fed to the admission valve through pipe 4 by means of a fuel pump (not shown) and fills the helical conduit 6, being heated therein by the exhaust gases escaping through the exhaust conduit 3. The pressure generated during the compression stroke of the pump acts on the shoulder formed between the bottom end of the needle valve 8 and its point 9 and causes the valve to be lifted from its seat, thereby allowing the fuel to be injected into the cylinder.

The helical conduit 6 can easily be cleaned by removing the sleeves 35 and 7.

In two stroke and in four stroke cycle engines the oil can also be heated by a very simple manner in the admission valve by causing this latter to be heated directly by the combustion which takes place in the cylinder. In such case it is preferable to employ an admission valve having a comparatively large surface exposed to the interior of the cylinder.

I wish it to be understood that I do not desire to be limited to the exact details of construction, shown and described, for obvious modifications will occur to a person skilled in the art.

I claim:—

1. The method of operating internal combustion engines comprising injecting into a body of hot compressed air a preheated and compressed mixture of liquid fuel and a readily vaporizable substance which does not form a solution with said fuel and preserves its own vapor tension.

2. The method of operating internal combustion engines comprising injecting into a body of hot air under pressure a mixture, preheated under a considerably higher pressure, of liquid fuel and a readily vaporizable substance which does not form a solution with said fuel and preserves its own vapor tension.

3. The method of operating internal combustion engines comprising injecting into a body of hot compressed air a preheated and compressed mixture of liquid fuel and water.

4. The method of operating internal combustion engines comprising injecting into a body of hot air under pressure a mixture, preheated under a considerably higher pressure, of liquid fuel and water.

5. Internal combustion engine comprising a cylinder, a piston in said cylinder, means for causing a charge of air to be compressed by said piston above ignition temperature, means communicating with said cylinder for preheating and compressing to a considerably higher pressure a mixture of liquid fuel and water, means for injecting into said cylinder a predetermined quantity of said mixture, and means for temporarily blocking the communication between said preheating means and said cylinder.

In testimony whereof I affix my signature on this 13th day of June, 1924.

ADOLF SCHNÜRLE.